United States Patent
Nack

(10) Patent No.: US 12,260,717 B1
(45) Date of Patent: Mar. 25, 2025

(54) SELF CONFIGURING GUIDANCE FOR SELF-CHECKOUT SYSTEMS

(71) Applicant: TOSHIBA GLOBAL COMMERCE SOLUTIONS, INC., Durham, NC (US)

(72) Inventor: Christopher J. Nack, Cary, NC (US)

(73) Assignee: TOSHIBA GLOBAL COMMERCE, Durham, NC (US)

( * ) Notice: Subject to any disclaimer, the term of this patent is extended or adjusted under 35 U.S.C. 154(b) by 0 days.

(21) Appl. No.: 18/526,804

(22) Filed: Dec. 1, 2023

(51) Int. Cl.
*G07G 1/00* (2006.01)
*G06V 20/52* (2022.01)

(52) U.S. Cl.
CPC ........... *G07G 1/0009* (2013.01); *G06V 20/52* (2022.01)

(58) Field of Classification Search
CPC .............................. G07G 1/0009; G06V 20/52
See application file for complete search history.

(56) References Cited

U.S. PATENT DOCUMENTS

2016/0063471 A1* 3/2016 Kobres ............ G06Q 20/40145
705/18

* cited by examiner

*Primary Examiner* — Matthew Mikels
(74) *Attorney, Agent, or Firm* — Patterson + Sheridan, LLP

(57) ABSTRACT

Embodiments herein describe techniques for identifying whether a POS system is in a right-handed configuration or left-handed configuration and then updating a software application in response. Embodiments herein describe using images captured of the POS system to determine its physical configuration and then updating a software application so it, for example, provides information to the customer based on the correct configuration. The images can be captured from one or more camera mounted on or near the POS system.

15 Claims, 4 Drawing Sheets

SELF CONFIGURING GUIDANCE FOR SELF-CHECKOUT SYSTEMS

BACKGROUND

Point of sale (POS) systems (such as self-checkout systems) are often sold as modular systems that can be configured in different ways. For example, a POS system may include a shelf for holding a shopping basket, a scanner for scanning items a customer wishes to purchase, and a bagging area for placing the items in bags after they have been scanned. The location and orientation of the POS system in a store may determine on which side of the scanner the shelf and bagging area are located. For example, store owners may want the bagging area to be on the side of the scanner closest to the store exit. In some orientations, the bagging area may be on the left side of the scanner relative to a customer facing the scanner (i.e., a left-handed configuration) while in other orientations, the bagging area may be on the right side of the scanner relative to the customer (i.e., a right-handed configuration). The operation of the POS system can vary depending on whether it is in the left-handed or right-handed configuration.

DETAILED DESCRIPTION

Figure 1:
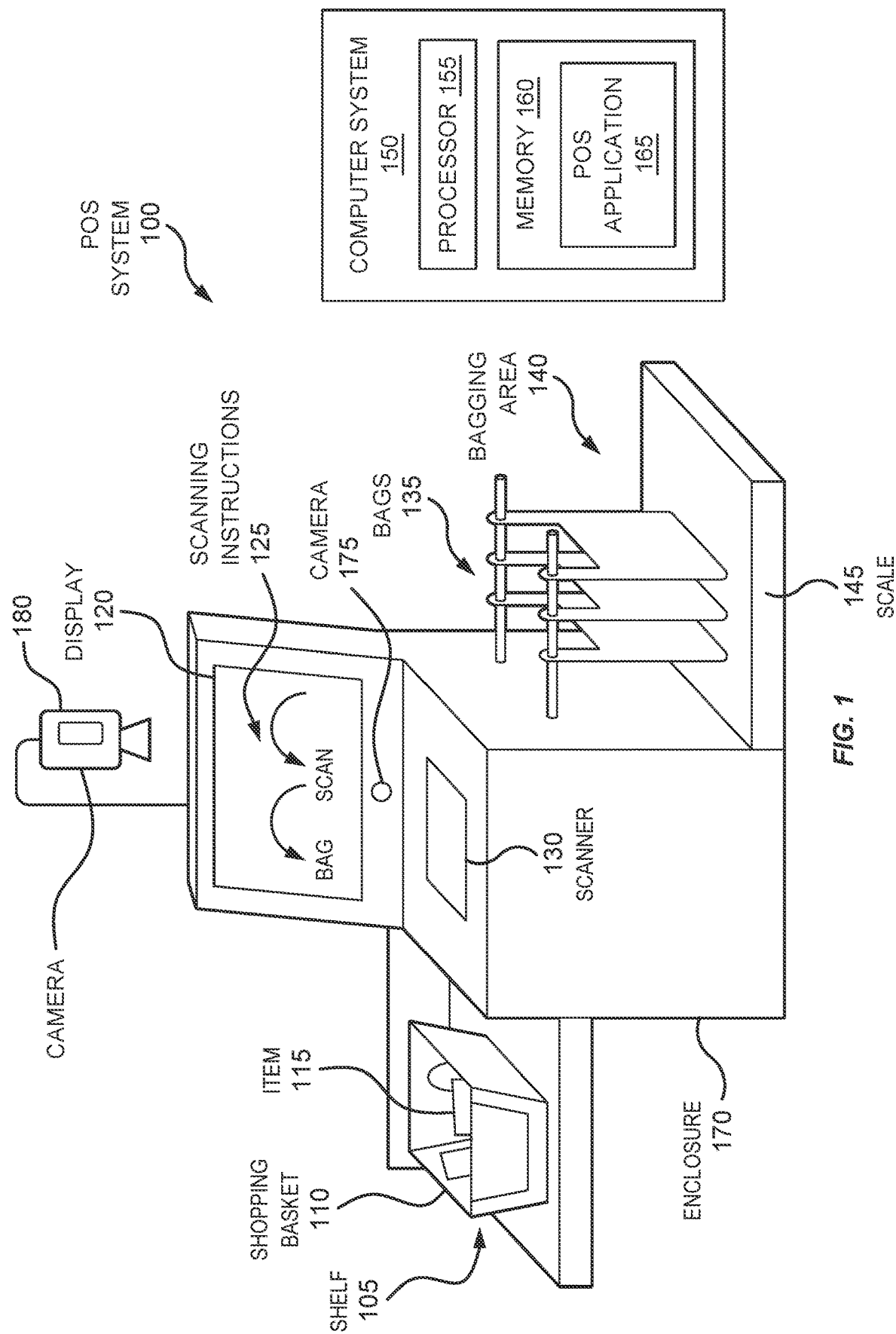
FIG. 1 illustrates a POS system, according to one embodiment.

Embodiments herein describe techniques for identifying whether a POS system is in a right-handed configuration or left-handed configuration and then updating a software application in response. POS systems typically include a display for outputting information to a customer, such as which items the customer has scanned, running totals, help buttons, and instructions. The instructions can include directions for scanning the items (e.g., retrieve an item, scan the item, and place the item in the bagging area) as well as troubleshooting instructions (e.g., when an item was placed in the bagging area without being scanned). These instructions can vary depending on whether the POS system is in the right-handed configuration or the left-handed configuration. For example, the instructions for placing a scanned item in the bagging area may have an arrow that points to the bagging area, which varies depending on whether the POS system is in the right-handed or left-handed configuration.

When installing a POS system, a technician can forget to indicate the configuration of the POS system (or make a mistake). Also, a store owner may move the POS system to a different location or orientation and switch between the right-handed and left-handed configurations. If the software application executing on the POS system (which controls what is output on the display) is not configured to match the physical configuration of the POS system, it can output confusing instructions such as pointing the wrong way to the bagging area.

Embodiments herein describe using images captured of the POS system to determine its physical configuration and then update a software application so it provides information to the customer based on the correct configuration. The images can be captured from one or more cameras mounted on or near the POS system. In one embodiment, a camera may capture items as they are scanned by the customer. The motion of the item (how it moves across the field of view of the camera) can be analyzed to identify where the bagging area is located, even if the bagging area is not within the field of view of the camera. In another embodiment, a camera field of view may capture the bagging area. An image detection algorithm can identify the bagging area, and then identify the configuration of the POS system based on the location of the bagging area. In either case, once the location of the bagging area is identified, the system can determine its configuration and update the software application accordingly.

Advantages of Determining a Physical Configuration of a POS System

Software applications executing on POS systems operate differently depending on whether the POS system has a left-handed configuration or right-handed configuration. The embodiments herein provide automatic methods, e.g., without human intervention, using image processing to ascertain the current physical configuration of a POS system and then reconfigure a software application in response. Doing so affects the processing and output of the software application executing on the POS system.

FIG. 1 illustrates a POS system 100, according to one embodiment. The POS system 100 includes a shelf 105 disposed on one side of an enclosure 170 and a bagging area 140 disposed on another (opposite) side of the enclosure 170. In one embodiment, the enclosure 170, the shelf 105, and the bagging area 140 are modular components—e.g., are not permanently connected to each other. As shown, relative to a customer facing the POS system 100, the shelf 105 is disposed on the left hand of the customer while the bagging area 140 is disposed on a right hand of the customer. Because these components are modular, the locations of the bagging area 140 and the shelf 105 can be switched so that the bagging area 140 is disposed on the left side of the enclosure 170 while the shelf 105 is disposed on the right side of the enclosure 170. The shelf 105 and the bagging area 140 may be connected (e.g., using fasteners or some other means) to the enclosure 170, but this is not a requirement. For example, the shelf 105 and the bagging area 140 may be connected to something besides the enclosure 170 (e.g., the floor or a frame) in order to hold these modular components in a fixed position.

As shown, the shelf 105 is used to hold a shopping basket 110 that includes items 115 a customer wishes to purchase using the POS system 100. For example, the customer may place the shopping basket 110 on the shelf 105 so the customer can easily remove and scan the items 115.

In other situations, the customer may have placed the items 115 in a shopping cart. The customer can use the shelf 105 to hold the items. For example, the customer may first unload the items 115 from the cart onto the shelf 105 to make the items 115 more accessible during the checkout process.

A display 120, camera 175, scanner 130, and camera 180 are mounted in or on the enclosure 170. For example, the display 120 may include a display screen which permits the POS system 100 to communicate with the customer. The display 120 can output price information, a purchase list, scanning instructions, troubleshooting instructions, and the like. In one embodiment, the display 120 is a touchscreen so that the user can interact with the display. For example, the user can use the touchscreen to select produce, cancel a scan, call for help, and the like.

The scanner 130 is disposed at a top of the enclosure 170 and provides an area where the customer can move or slide the items to read a barcode on the item 115. The scanner 130 can also include an integrated scale for weighing items such as produce. The embodiments herein are not limited to any particular type of scanning technology, or a particular number of scanners.

The camera 175 is disposed at a location on the enclosure so its field of view includes the scanner 130. That way, the camera 175 can capture images of a customer moving items onto and over the scanner 130. In one embodiment, the camera 175 has dual purposes. One purpose may include capturing images of items that do not have barcodes such as produce. A machine learning or artificial intelligence model can be used to perform image recognition to identify the produce. This saves the customer from having to manually identify the produce for the POS system 100 (e.g., select the produce from a menu on the display 120 or enter in a code). In one embodiment, the images captured by the camera 175 can be used to determine on which side of the enclosure the bagging area 140 and the shelf 105 are disposed. For example, the images captured by the camera 175 can be analyzed to determine the motion of the items 115 as they are moved into and out of the region of the scanner 130. This is discussed in more detail in FIG. 4 below.

FIG. 1 also illustrates mounting the overhead camera 180 onto the enclosure. In one embodiment, the POS system 100 may have only one of the cameras 175 or 180, but in other embodiments, it may have both cameras. The camera 180 can also have dual purposes. One purpose may be for loss prevention where the images captured by the camera 180 are analyzed to determine whether a customer has moved an item 115 into the bagging area 140 (either accidentally or nefariously) without first scanning the item 115 using the scanner 130. To do so, the field of view of the camera 180 can include the bagging area 140 and the scanner 130, as well as other areas of the POS system 100.

In another embodiment, because the overhead camera 180 can see at least the bagging area 140, its captured images can be used to identify the location of the bagging area 140 (e.g., using an image analysis algorithm). For example, the POS system 100 can determine on which side of the enclosure 170 the bagging area 140 is disposed on. This can then indicate the physical configuration of the POS system 100 (whether it is in the left-handed configuration or the right-handed configuration). This is discussed in more detail in FIG. 5.

The bagging area 140 includes bags 135 disposed on hangers. After scanning items 115, the user can place the items in the bags 135. The bagging area 140 also includes a scale 145. The scale 145 weighs the items after being placed in the bags 135 (or in the customer's own bags if they brought them) to see if the weight of the item matches the expected weight of the item that was sold. This can also help with loss prevention.

The POS system 100 also includes a computing system 150. The computing system 150 may be integrated into the enclosure 170 (e.g., as part of the display 120) or may be remote from the POS system 100 but communicatively coupled using, e.g., an Ethernet cable. The computer system 150 can represent any number of computing devices. For example, the computer system 150 can be implemented by a computer device disposed in the enclosure 170, or can be a server that is disposed elsewhere in the store.

The computing system 150 includes a processor 155 and memory 160. The processor 155 represents one or more processing elements which each can include one or more processing cores. The memory 160 can be volatile memory, non-volatile memory, and combinations thereof. The memory 160 includes a POS application 165 (e.g., a software application) that controls the operations of the POS system 100. For example, the POS application 165 can include any number of software modules (or a suite of software applications) that communicates with the scanner 130, cameras 175 and 180, the display 120, the scale 145, and other components in the POS system 100. The POS application 165 can receive input from these components as well as send instructions.

In one embodiment, the POS application 165 uses the images captured by the camera 175 or the camera 180 to determine the physical configuration of the POS system 100—e.g., whether the system 100 is in the left-handed configuration or the right-handed configuration. The POS application 165 can then ensure it operates based on the correct configuration.

FIG. 1 illustrates an instance where the POS application 165 is not operating based on the correct configuration. In FIG. 1, the POS system 100 has the right-handed configuration since the bagging area 140 is at the customer's right side when facing the POS system 100. However, the scanning instructions 125 on the display 120 illustrate scanning instructions for when the POS system 100 is in a left-handed configuration. That is, the scanning instructions 125 are based on the shelf 105 being on the right side of the enclosure 170 while the bagging area 140 is disposed on the left side of the enclosure 170. As such, the scanning instructions 125 show instructions for the customer to retrieve an item from the right side, scan the item at the scanner 130, and then bag the item on the left side. However, the scanning instructions 125 should instead show retrieving an item from the left side, scanning the item at the scanner 130, and then bagging the item on the right side. The embodiments herein describe techniques that the POS application 165, using one (or both) of the cameras 175 and 180 can automatically detect the physical configuration of the POS system 100 and update its operation accordingly.

Figure 2:
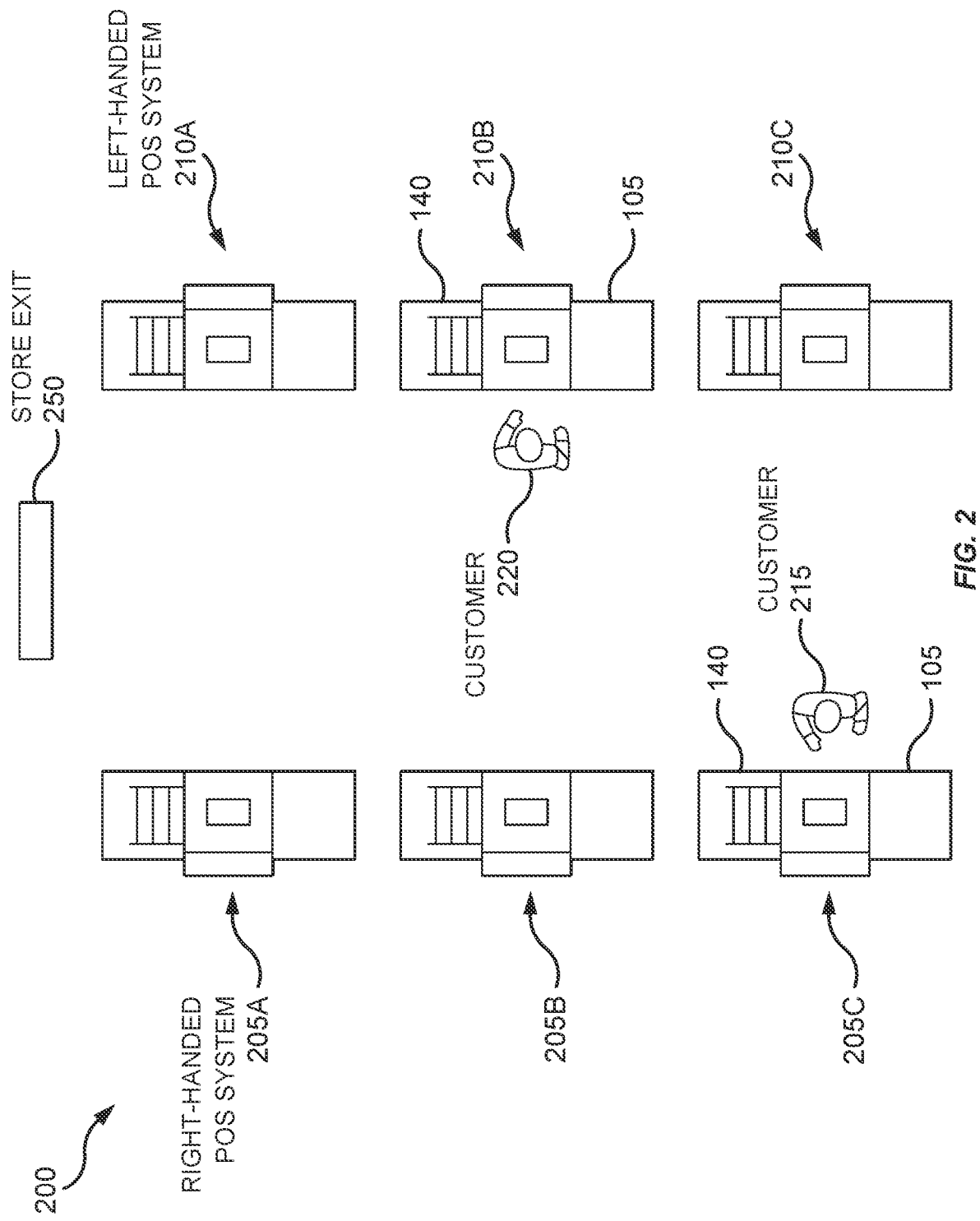
FIG. 2 illustrates a top down view of POS systems in the right-handed and left-handed configurations, according to one embodiment.

FIG. 2 illustrates a top down view 200 of POS systems in the right-handed and left-handed configurations, according to one embodiment. The top down view 200 illustrates three POS systems 205A-C arranged as right-handed POS systems and three POS systems 210A-C arranged as left-handed POS systems. The six POS systems are arranged so that there is a row in between where customers can move to a free station.

When forming a POS configuration as shown in FIG. 2, it is often desirable to configure the POS systems so that the bagging areas 140 are closest to the store exit 250. This is often more intuitive to the customers. As such, the POS systems 205A-C on the left side of the column are in the right-handed configuration while the POS system 210A-C on the right side of the column are in the left-handed configuration. For example, the customer 215 is using the POS system 205C to checkout, where the bagging area 140 is on the right side of the customer 215 and the shelf 105 is on the left side of the customer 215 (i.e., the right-handed configuration). In contrast, the customer 220 is using the POS system 210B to checkout, where the bagging area 140 is on the left side of the customer 220 and the shelf 105 is on the right side of the customer 220 (i.e., the left-handed configuration).

When installing the POS systems, the POS application may ask the installer the configuration. If the installer makes a mistake, then the POS application may operate incorrectly (as shown by the scanning instructions 125 in FIG. 1). Or the store may move a POS system to a different part of the store and change its configuration without informing the POS application. In this manner, the POS application may provide feedback or instructions to the customers based on an incorrect assumption of the physical configuration of the POS system.

Figure 3:
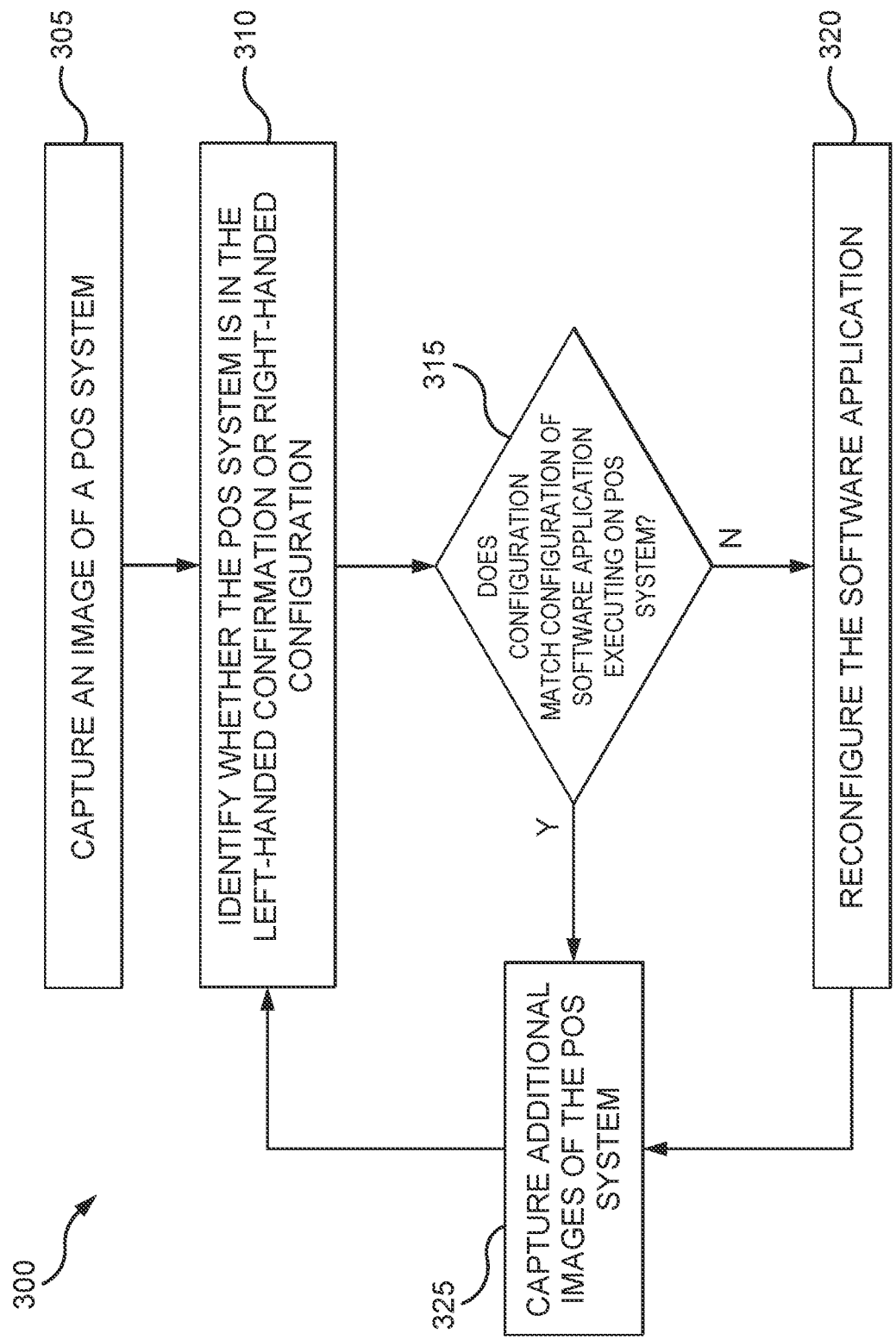
FIG. 3 is a flowchart for updating a software application in response to determining whether a POS system is in the right-handed configuration or the left-handed configuration, according to one embodiment.

FIG. 3 is a flowchart of a method 300 for updating a software application in response to determining whether a POS system is in the right-handed configuration or the left-handed configuration, according to one embodiment. At block 305, a camera captures an image of a POS system. In one embodiment, the camera may be mounted on or in the POS system. For example, the camera may be the camera 175 or 180 illustrated in FIG. 1. In another embodiment, the camera may not be mounted on the POS system. For example, a camera in a first POS system may be in the field of view of a camera on a second POS system. The images captured by the camera on the second POS system can be used to determine the physical configuration of the first POS system using method 300. Or a store camera (e.g., mounted in the roof of the store) may have a field of view that includes the POS system. The images captured by the camera can be used in the method 300 to identify the physical configuration of one or more POS systems. Thus, the embodiments herein are not limited to using a camera on or in the POS system.

At block 310, a software application (e.g., the POS application 165 in FIG. 1) identifies whether the POS system is in the left-handed configuration or right-handed configuration. In one example, the software application analyzes the images captured at block 305 to determine the direction the customer moves items across the scanner region. For example, if the items move (relative to the customer) from right to left when being scanned, this indicates the bagging area is on the left side of the POS system, and thus, the system is in the left-handed configuration. In contrast, if the items move (relative to the customer) from left to right when being scanned, this indicates the bagging area is on the right side of the POS system, and thus, the system is in the right-handed configuration.

In another example, the images may capture some or all of the bagging area. An image detection algorithm (e.g., a ML or AI image detection model) can analyze the image to identify the bagging area. For example, a ML or AI image detection model can be trained to recognize the bagging area based on its features such as containing bags, the scale, and the like. The camera may have a known position relative to the POS system, thus, by identifying the location of the bagging area in the image, the software application can determine on which side of the POS system the bagging area is disposed. In another example, if the position of the camera relative to the POS system is not known, the ML or AI image detection model can detect multiple components in the images such as the shelf, scanner, or display, as well as the bagging area. Based on identifying multiple components, the software application can determine their relative positions, and thus, the physical configuration of the POS system.

In yet other embodiments, the software application could identify in the image where the shelf (e.g., the shelf 105 in FIG. 1) is relative to the scanner or enclosure. Thus, even if the image does not include the bagging area, by knowing the location of the shelf, the software application can deduce that the bagging area is on the other side of the enclosure, thereby determining the physical configuration of the POS system.

At block 315, the software application determines whether the configuration matches its current configuration. For example, the software application may check to ensure it is operating based on the detected physical configuration.

In one embodiment, the software application that detects the current configuration of the POS system may be different from the software application that controls the POS system. In that case, the software application that detects the current configuration of the POS system can send an instruction to the POS controlling the POS system to ensure it is operating based on the current configuration.

If the current configuration does not match, the method 300 proceeds to block 320 where the software application executing on the POS system is reconfigured. As such, when outputting instructions or feedback to the customer, the POS system can now indicate the correct location of the bagging area and the shelf shown in FIG. 1.

If the current configuration does match, the method 300 proceeds to block 325 where the camera captures additional images of the POS system. This can occur over time. The method 300 can then return to block 320 where those images are evaluated to determine whether the configuration has changed. In this manner, the software application can detect a situation where the POS system may, at Time A, have a first physical configuration but then be moved or rearranged at Time B to have a second physical configuration. That way, the operation of the software application executing on the POS system can be automatically changed without a human having to reconfigure the application (e.g., without a service call).

Figure 4:
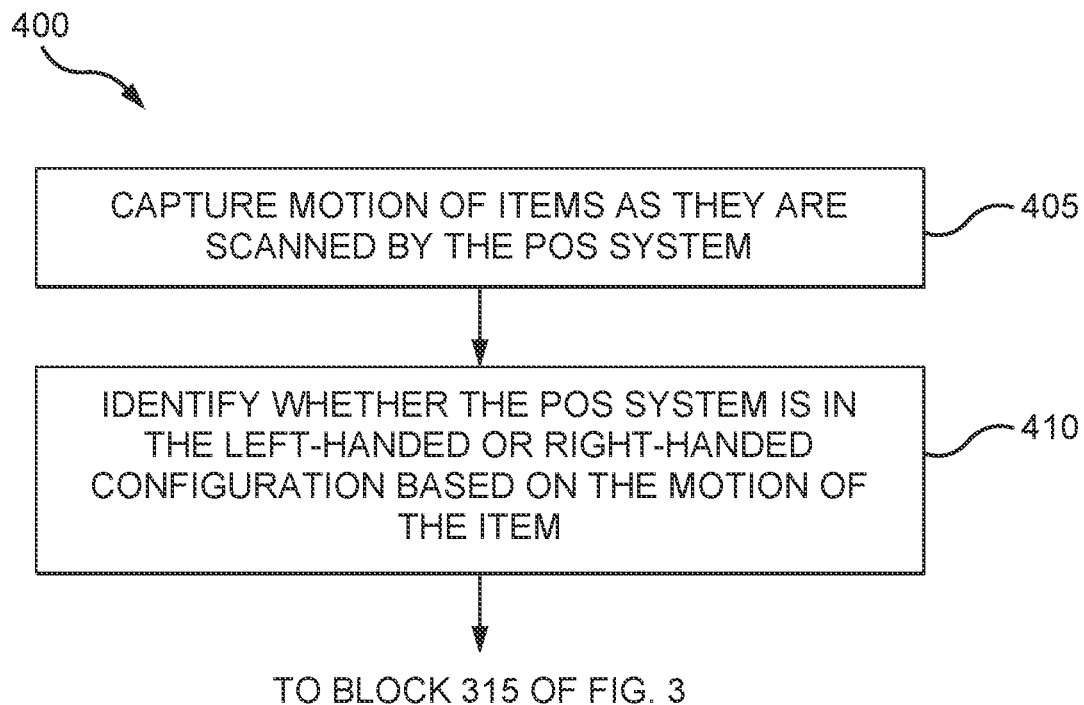
FIG. 4 is a flowchart for determining whether a POS system is in the right-handed configuration or the left-handed configuration using motion, according to one embodiment.

FIG. 4 is a flowchart of a method 400 for determining whether a POS system is in the right-handed configuration or the left-handed configuration using motion, according to one embodiment. Method 400 illustrates one example implementation of capturing images of a POS system which can then be used to identify the physical configuration of the POS system.

At block 405, a camera captures motion of items as they are scanned by the POS system. For example, the camera used in method 400 may be the camera 175 in FIG. 1 that monitors the scanning area of the POS system. The field of view of the camera 175 may not include the bagging area or the shelf. As such, based on simply determining the location of components the images captured by the camera 175, it may be impossible to determine whether the POS system is in the left-handed configuration or the right-handed configuration. Nonetheless, the method 400 can be performed to still determine the configuration of the POS system. Thus, the method 400 may be preferred or used when a camera does not have a field of view that captures either the bagging area or the shelf.

At block 410, the software application identifies whether the POS system is in the left-handed configuration or the left-handed configuration based on the motion of the item. For example, if the customer moves the item from right to left (relative to the perspective of the customer) this implies that the bagging area is on the left side of the POS system while the shelf is on the right side of the POS system, and thus, the POS system is in the left-handed configuration.

Conversely, if the customer moves the item from left to right (again relative to the perspective of the customer) this implies that the bagging area is on the right side of the POS system while the shelf is on the left side of the POS system, and thus, the POS system is in the right-handed configuration. In this manner, the motion of items as the customer moves them through the POS system can be used to deduce the physical configuration of the POS system.

The method 400 can then proceed to block 315 of FIG. 3 to determine whether the physical configuration determined by the method 400 matches the physical configuration stored in the POS application controlling the POS system.

In one embodiment, the camera used in the method 400 has dual purpose. One purpose is to capture images (e.g., video) that can be used to detect the motion of the item, but other purposes can be to identify produce or to aid with loss prevention.

Figure 5:
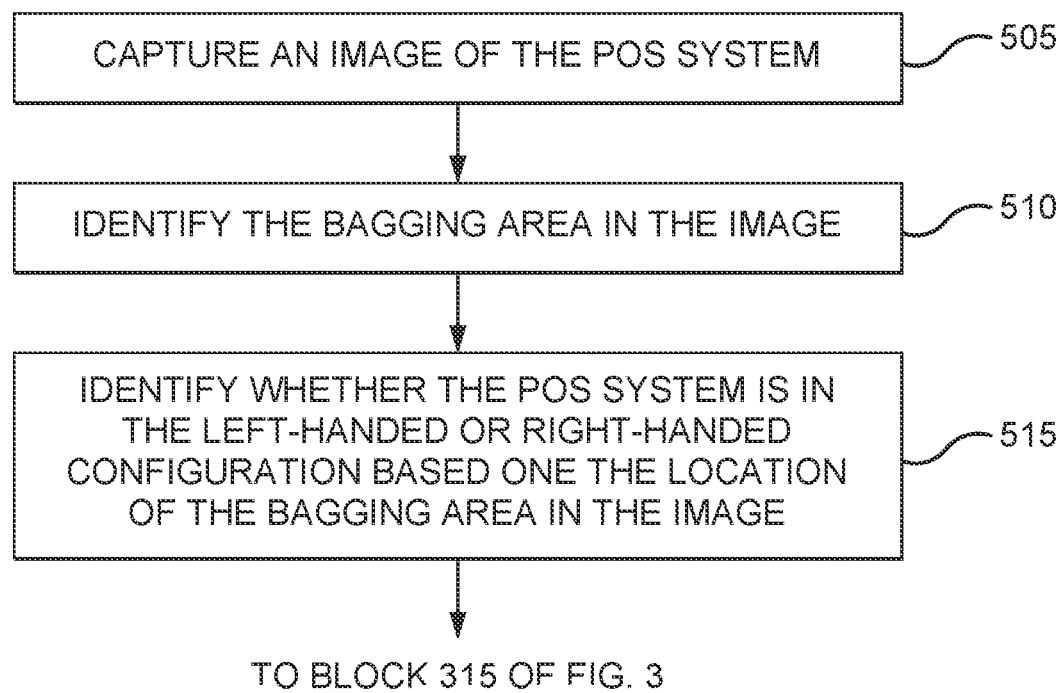
FIG. 5 is a flowchart for determining whether a POS system is in the right-handed configuration or the left-handed configuration by identifying a component in the POS system, according to one embodiment.

FIG. 5 is a flowchart of a method 500 for determining whether a POS system is in the right-handed configuration or the left-handed configuration by identifying a components in the POS system, according to one embodiment. Method 500 illustrates another example implementation of capturing images of a POS system which can then be used to identify the physical configuration of the POS system.

At block 505, a camera captures an image of the POS system. The camera used in method 500 may be a camera that includes in its field of view the shelf and/or the bagging area of the POS system. The camera may be mounted on the POS system, such as the camera 180 in FIG. 1, or can be mounted somewhere else on the store—e.g., on another POS system or on a ceiling of the store.

At block 510, the software application uses an object detection algorithm (e.g., a ML or AI model) to identify the bagging area in the image. In some embodiments, the image may not include the bagging area, but include the shelf. The location of the shelf can also be used to determine the physical configuration of the POS system. However, it may be easier to detect the location of the bagging area since it may have features or components that are easier for the object detection algorithm to detect than the shelf. Indeed, the method 500 can be used to detect any component in the POS system which, when identified, can be used to determine the physical configuration of the POS system.

At block 515, the software application identifies whether the POS system is in the left-handed or right-handed configuration based on the location of the bagging area (or the location of the shelf). The software application can analyze the image to identify the bagging area or the shelf. For example, a ML or AI image detection model can be trained to recognize the bagging area or the shelf based on identifying characteristics. The camera may have a known position relative to the POS system, thus, by identifying the location of the bagging area or shelf in the image, the software application can determine on which side of the POS system these components are disposed. In another example, if the position of the camera to the POS system is not known, the software application can detect multiple components in the images such as the shelf, scanner, or display, as well as the bagging area. Based on identifying multiple components and their relative positions, the software application can determine the physical configuration of the POS system.

The method 500 can then proceed to block 315 of FIG. 3 to determine whether the physical configuration determined by the method 500 matches the physical configuration stored in the POS application controlling the POS system.

In one embodiment, the camera used in the method 500 has dual purpose. One purpose is to capture images (e.g., video) that can be used to detect the location of the bagging area, shelf, or some other component in the POS system that is related to its physical configuration, but another purpose could be to aid with loss prevention.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements discussed above, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages discussed above are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method comprising:
   capturing an image of a point-of-sale (POS) system, wherein the POS system comprises:
      a bagging area disposed on a first side of a scanner in the POS system; and
      a shelf for holding items to purchase disposed on a second, opposite side of the scanner;
   identifying, based on analyzing the image, that the POS system is in a first configuration or a second configuration, wherein the first configuration and the second configuration represent a location of at least the bagging area in the POS system; and
   reconfiguring a software application controlling the POS system in response to identifying that the POS system is in the first configuration or the second configuration.

2. The method of claim 1, wherein reconfiguring the software application comprises:
   reconfiguring the software application to output instructions for display depending on whether the POS system is in the first configuration or the second configuration, wherein the first configuration is a left-handed configuration and the second configuration is a right-handed configuration.

3. The method of claim 1, wherein capturing the image comprises:
capturing video of an item being moved proximate to the scanner in the POS system.

4. The method of claim 3, wherein identifying that the POS system is in the first configuration or the second configuration comprises:
determining a direction of motion of the item in the video; and
determining the location of the bagging area in the POS system based on the motion.

5. The method of claim 1, wherein a camera that captures the image includes in its field of view at least one of the bagging area or the shelf in the POS system, wherein the shelf is configured to hold the items to purchase before the items are scanned in the POS system.

6. The method of claim 5, wherein identifying that the POS system is in the first configuration or the second configuration comprises:
identifying a location of at least one of the bagging area or the shelf in the image to determine that the POS system is in a left-handed configuration or a right-handed configuration.

7. A POS system, comprising:
a scanner;
a bagging area, wherein the bagging area is disposed on a first side of the scanner in the POS system;
a shelf for holding items to purchase, wherein the shelf is disposed on a second, opposite side of the scanner; and
a computing system for controlling the POS system, the computing system configured to:
receive an image of the POS system,
identify, based on analyzing the image, that the POS system is in a first configuration or a second configuration, and
reconfigure a software application for controlling the POS system in response to identifying that the POS system is in the first configuration or the second configuration.

8. The POS system of claim 7, further comprising:
a display,
wherein reconfiguring the software application comprises:
reconfiguring the software application to output instructions on the display that depend on whether the POS system is in the first configuration or the second configuration, wherein the first configuration is a left-handed configuration and the second configuration is a right-handed configuration.

9. The POS system of claim 7, wherein the first configuration and the second configuration represent a location of the bagging area in the POS system.

10. The POS system of claim 7, further comprising:
a camera configured to capture video of an item being moved proximate to the scanner.

11. The POS system of claim 10, wherein identifying that the POS system is in the first configuration or the second configuration comprises:
determining a direction of motion of the item in the video; and
determining a location of the bagging area in the POS system based on the motion.

12. The POS system of claim 7, further comprising:
a camera configured to capture the image, wherein the camera has a field of view that includes at least one of the bagging area or the shelf in the POS system, wherein identifying that the POS system is in the first configuration or the second configuration comprises:
identifying a location of at least one of the bagging area or the shelf in the image to determine that the POS system is in a left-handed configuration or a right-handed configuration.

13. A computer readable storage medium having computer readable program code embodied therewith, the computer-readable program code executable by one or more computer processors to perform an operation, the operation comprising:
capturing an image of a POS system, wherein the POS system comprises:
a bagging area, wherein the bagging area is disposed on a first side of a scanner in the POS system; and
a shelf for holding items to purchase, wherein the shelf is disposed on a second, opposite side of the scanner:
identifying, based on analyzing the image, that the POS system is in a first configuration or a second configuration, wherein the first configuration and the second configuration represent a location of at least the bagging area in the POS system; and
reconfiguring a software application controlling the POS system in response to identifying that the POS system is in the first configuration or the second configuration.

14. The computer readable storage medium of claim 13, wherein reconfiguring the software application comprises:
reconfiguring the software application to output instructions for display depending on whether the POS system is in the first configuration or the second configuration, wherein the first configuration is a left-handed configuration and the second configuration is a right-handed configuration.

15. The computer readable storage medium of claim 13, wherein capturing the image comprises:
capturing video of an item being moved proximate to the scanner in the POS system, wherein identifying that the POS system is in the first configuration or the second configuration comprises:
determining a direction of motion of the item in the video; and
determining the location of the bagging area in the POS system based on the motion.

* * * * *